April 30, 1935.   R. B. DOME   1,999,869
MEASURING SYSTEM
Filed March 1, 1933
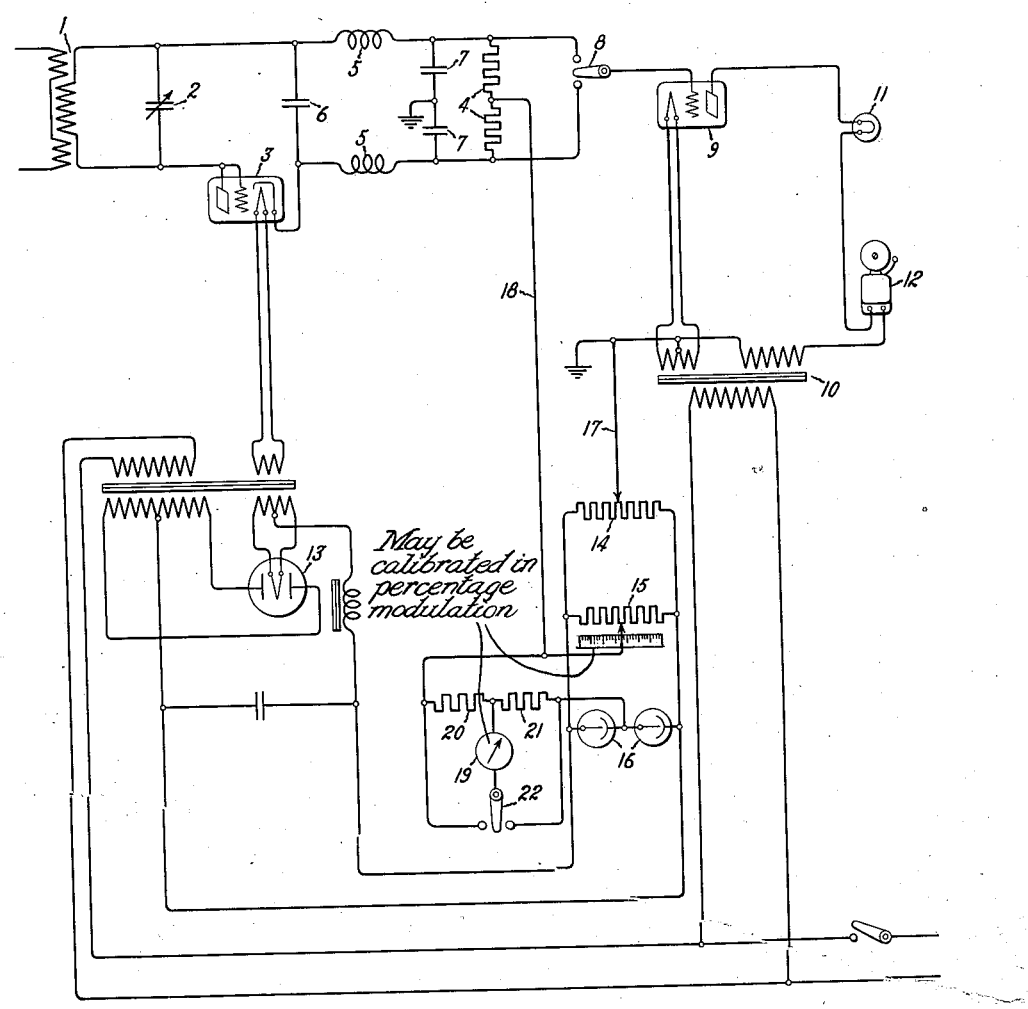
Inventor:
Robert B. Dome,
by Charles E. Muller
His Attorney.

Patented Apr. 30, 1935

1,999,869

UNITED STATES PATENT OFFICE 1,999,869

MEASURING SYSTEM

Robert B. Dome, Schenectady, N. Y., assignor to General Electric Company, a corporation of New York Application March 1, 1933, Serial No. 659,200

10 Claims. (Cl. 179—171)

The present invention relates to a testing instrument for transmitters and more particularly to an instrument for measuring or indicating the percent of modulation of radio frequency or carrier currents.

In adjusting a transmitter of radio frequency or carrier currents it is necessary to measure or obtain the percent of modulation so that the transmitter may be checked as to the operation of the modulating equipment. It often occurs that a modulator may modulate the positive side of the carrier current more, or less, than the negative side, or that distortive peaks may appear on one side, and this condition is to be avoided. Furthermore it is desirable to operate the transmitter at a fixed percent of modulation which should not be exceeded. It is therefore necessary to provide means whereby measurements and observations of the above-mentioned condition may be readily observed.

Such measurements may be made in the laboratory with oscilloscopes and other laboratory instruments, but these instruments are inconvenient to use at transmitting stations where the operator usually does not possess laboratory experience and where it is desired to simplify all the equipment as much as possible.

It is therefore an object of my invention to provide a modulation indicator which can be used to measure selectively either the positive or negative modulation of radio frequency or carrier currents.

A further object of my invention is to provide a modulation indicator which will provide a signal or an alarm when a predetermined modulation percentage is exceeded on either positive or negative peaks.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawing in which the figure represents a preferred embodiment of my invention.

Referring to the figure in the drawing, I have illustrated therein a modulation indicator and alarm circuit including transformer means 1 for impressing modulated high frequency currents from the transmitter or other source upon the tuned circuit comprising the secondary winding of the transformer 1 and a variable capacitor 2. A suitable rectifier or electron discharge device 3, which may be of the three-element type with the grid and anode connected together, is connected to the tuned input circuit for reducing the modulated high frequency current to modulated direct current. The anode and grid of the discharge device 3 are connected to one extremity of the tuned circuit comprising the transformer 1 and the variable capacitor 2. The cathode of the discharge device is connected to a direct current branch circuit which includes a resistor 4 the other extremity of which is returned to the tuned input circuit. A filter circuit comprising a pair of inductors 5 and bypass capacitors 6, 7, arranged in shunt to the direct current branch 4 is provided to prevent any remaining high frequency currents from being present in the direct current branch. The modulated direct currents present in the resistor 4 due to the action of the rectifier 3 develop a voltage across the resistor. A switch 8 is arranged so that connection may be made selectively to either extremity of the resistor.

An electron discharge device 9, preferably one of the electrostatically controlled arc discharge type having a cathode, an anode, and a control member, is arranged so that by means of the switch 8 the control member may be connected to either extremity of the resistor 4. The cathode and anode of this discharge device are energized by a source of alternating potential obtained from a suitable transformer 10 which may be energized from the ordinary alternating current lines. The anode circuit of the device includes an indicating lamp 11 and an alarm 12, the purpose of which will become apparent later. A suitable source of direct current voltage, which may be obtained from a power pack or alternating current rectifier 13, is impressed across resistors 14 and 15. In order to maintain the source of voltage reasonably constant a pair of regulating glow discharge devices 16 are connected in series across the source of direct current potential. These devices normally pass current and maintain a constant voltage across resistance 15 and a constant voltage point between the two glow discharge devices. A portion of the potential existing across the resistor potentiometers 14 and 15 is applied between the cathode of the discharge device 9 and the midpoint of the resistor 4 by means of the conductors 17 and 18 which are connected to adjustable contacts on the resistor potentiometers. A voltmeter which may comprise a milliammeter 19 and suitable resistors 20 and 21, is connected between the conductor 18, which is connected to the movable contact on resistance 15, and the constant voltage point between the glow discharge devices 16, whereby this voltmeter indicates a voltage equivalent to that between the center of resistance 15 and the movable contact thereon. A switch 22 permits the meter 19 to be connected in a manner to short circuit either one of the resistors 20 and 21, as desired, so as to obtain the proper polarity across the instrument 19.

The electrostatically controlled arc discharge device 9 contains an ionizable medium such as a suitable inert gas or mercury vapor, and has a high current carrying capacity between the cathode and anode. When a certain definite grid voltage is reached the control member or grid operates to start the flow of anode current, but it does not have any appreciable control of the duration or magnitude of the anode current. The duration of the anode current is controlled by interruption or reduction of the voltage applied to the anode, and the magnitude of the anode current is dependent upon the voltage applied to the anode and the constants of the anode circuit. For every value of anode voltage there is a definite grid voltage at which the anode current flow is initiated by ionization of the ionizable medium. Whenever this grid voltage is reached or exceeded the full anode current flows.

In operation the following adjustments are carried out. The switch 8 is connected to one of the extremities of the resistor 4 and the adjustable contact on the resistor 14 is adjusted to produce such a bias on the grid of electron discharge device 9 that anode current just fails to flow. An unmodulated carrier current is then impressed upon the transformer 1 which causes a direct current to flow through the resistor 4. Anode current may, or may not, now flow in the discharge device 9 dependent upon the polarity of the voltage produced on resistance 4 by rectification of the unmodulated carrier. The adjustable contact on the resistor 15 is then adjusted so that the electron discharge device 9 again is at anode current cut off, or anode current just fails to flow. The switch 22 is thrown in the proper direction so that the amount of voltage $E_1$ supplied by the resistor 15 may be measured. Then a modulated carrier current is impressed upon the transformer 1 which is reduced to modulated direct current by the discharge rectifier 3 thus producing a modulated direct current in the resistor 4. This modulated direct current produces pulsations of direct current voltage which are impressed upon the control member of the discharge device 9. The adjustable contact on the resistor 15 may then be adjusted to supply a voltage $E_2$ so that the discharge device 9 again is at anode current cut-off. This voltage is equal to $$E_2 = E_1 (1 + m \sin wt)$$

where $E_1$ = the voltage due to the rectified carrier alone, $m$ = to the percent of modulation, and $w = 2\pi f$ where $f$ = the audio frequency. The maximum value of this function is given when sin $wt = 1$; substituting 1 for sin $wt$, we have the maximum value equation, $$E_2 = E_1 + mE_1 = E_1 (1 + m)$$

wherein $m$ is equivalent to the percent of modulation of the carrier. From this equation the percent of modulation $m$ may be obtained. It is thus apparent that if $E_2$ and $E_1$ are made known by the meter readings, the positive modulation of the carrier wave may be determined and by proper calibration of meter scale may be read directly.

In order to measure the negative peaks of modulation a switch 8 is connected to the opposite extremity of the resistor 4. The adjustable contact of the resistor 14 remains set as obtained by the previous operation. The adjustable contact 15, however, must be moved in the opposite direction so as to provide a positive voltage $E_1'$ so as to bring the tube to just cut-off when an unmodulated carrier is impressed upon the tuned input circuit of the rectifier 3. Now if a modulated carrier is impressed upon the input circuit the negative peaks of the carrier cause the direct current pulsations to require a less positive voltage $E_2'$ from the resistor 15 to accomplish anode current cut-off of the discharge device 9. This voltage which may be measured by the voltmeter 19 by throwing the switch 22 to the opposite direction, is expressed by the equation $$E_2' = E_1' (1 - m).$$

The resistor 15 may be calibrated so that certain points thereon will indicate a definite percentage of modulation of the carrier current. It will thus be apparent that this arrangement provides a convenient means for obtaining the percentage of modulation.

It is desirable, however, at a transmitting station to provide means for telling when anode current cut-off is reached. A meter in the anode circuit of the discharge device 9 would suffice but for a radio station or transmitter service the pilot light 11 and the alarm 12 are more suitable as they do not require constant watching. Thus whenever a voltage is present upon the control member of the discharge device 9 in excess of a biasing voltage sufficient to bring the device to anode current cut-off, anode current will flow at the pilot light 11 and the alarm 12 will be actuated. It is of course understood that anode current in the discharge device 9 flows only during the half cycles of the operating voltage when the anode is positive. Thus if the grid voltage be reduced below the critical or cut-off value when the anode is positive anode current continues to flow until the end of the respective half cycle.

While I have shown and described my invention in connection with certain specific embodiments it will, of course, be understood that I do not wish to be limited thereto, since it is apparent that the principles herein disclosed are susceptible of numerous other applications, and modifications which may be made in the circuit arrangements or in the instrumentalities employed without departing from the spirit and scope of my invention as set forth in the appended claims.

What I claim as new and desire to secure by Letters Patent of the United States is:

1. An apparatus for indicating the percent of modulation of radio frequency current including a rectifier for reducing modulated radio frequency current to modulated direct current, means including a resistor for producing a voltage in accordance with said modulated direct current, an electrostatically controlled arc discharge device having a cathode, a control element and an anode, said control element being connected to said resistor, means including a source of voltage opposite in polarity to said direct current and connected between said resistor and said cathode, and means connected between said anode and said cathode for indicating when at least a predetermined percent of modulation is present.

2. An apparatus for indicating the percent of positive and negative modulation including an input circuit for receiving modulated radio frequency current, means connected to said circuit for reducing said modulated radio frequency current to modulated direct current, a circuit for said direct current including a resistor for developing voltages in accordance with said modulated direct current, means including a source of potential and an indicator connected between the midpoint of said resistor and either extremity thereof for indicating the percent of modulation, and means for selectively connecting said latter means to either extremity of said resistor and for selecting the proper polarity of said source of potential whereby positive and negative modulation may be measured selectively.

3. A modulation alarm for a carrier current transmitter for indicating modulation of carrier current in excess of a predetermined amount, including means for reducing modulated carrier current to modulated direct current, means for developing a voltage in accordance with said modulated direct current, an electrostatically controlled arc discharge device having a grid, an anode and a cathode, said grid being connected to said voltage developing means, means connected in series with said voltage developing means and said cathode for partially neutralizing the effect of said voltage developing means when the modulation is the desired predetermined amount, and means connected in the anode circuit of said device for indicating when the modulation exceeds said predetermined amount.

4. A modulation alarm for a radio transmitter for selectively indicating positive and negative modulation of radio frequency current in excess of a predetermined amount including means for reducing modulated radio frequency current to modulated direct current, means including a resistor for developing a voltage in accordance with said modulated direct current, an electrostatically controlled arc discharge device having a cathode, a grid and an anode, means for selectively connecting said grid to either extremity of said resistor, means connected between said resistor and said cathode for selectively biasing said grid with a polarity opposite to the voltage present across said resistor connected to said grid, and means connected in the anode circuit of said discharge device for giving an alarm when the modulation exceeds a predetermined amount.

5. An electrical apparatus for testing the modulation of radio frequency currents, including an input circuit for receiving modulated radio frequency currents, an electron discharge rectifier, an output circuit therefor including a direct current branch and a filter for by-passing radio frequency currents, said direct current branch including a resistor, an electrostatically controlled arc discharge device having a cathode, an anode and a control member, means for connecting said control member to either extremity of said resistor, means connected between the cathode of said arc discharge device and the midpoint of said resistor for selectively biasing positively or negatively the control element of said device, and means connected in the anode circuit of said arc discharge device for indicating modulation in excess of a predetermined amount.

6. A modulation indicator for a carrier current transmitter for indicating modulation of carrier current in excess of a predetermined amount, including means for reducing modulated carrier current to modulated direct current, means for developing a voltage in accordance with said modulated direct current, an electrostatically controlled arc discharge device having a grid, an anode and a cathode, said grid being connected to said voltage developing means, means for rendering said discharge device inoperative when the modulation is not in excess of the desired predetermined amount, and means connected in the anode circuit of said device for indicating when the modulation exceeds said predetermined amount.

7. The combination, in a system for indicating modulation of carrier current in excess of a predetermined amount, of means for reducing the modulated carrier current to modulated direct current, means for producing a voltage in accordance with said modulated direct current, an electron discharge device containing an ionizable gas and having an anode, a cathode and a control member, said voltage developing means being connected to apply a potential to said control member, means connected in the circuit of said discharge device for preventing ionization of said discharge device when said modulation is less than said predetermined amount, and means connected in the anode circuit of said discharge device responsive to ionization of said gas within said discharge device for indicating modulation in excess of said predetermined amount.

8. An apparatus for indicating modulation of carrier current in excess of a predetermined amount, including means for reducing modulated carrier current to modulated direct current, means for developing a voltage in accordance with said modulated direct current, an electron discharge device containing an ionizable medium and having an anode, a cathode and a control member, said voltage developing means being connected to apply a potential to said control member, means to render said discharge device substantially non-conductive when the potential on said control member is below a certain value and highly conductive when said potential is at least equal to said certain value, and means connected in the anode circuit of said discharge device for indicating when said discharge device becomes conductive.

9. An apparatus for a carrier current transmitter for indicating modulation of carrier current in excess of a predetermined amount, including means for producing a unidirectional voltage having a value dependent upon the amount of modulation of the carrier current, an electron discharge device having a cathode, an anode and a grid enclosed in an ionizable gaseous medium, said voltage developing means being connected to apply a voltage to said grid, means connected in series with said voltage developing means for reducing the voltage applied to said grid when the modulation is the desired amount and means connected to the anode circuit of said discharge device for indicating in response to anode current when the modulation exceeds said predetermined amount, said discharge device being characterized by being substantially non-conductive when the potential on said grid is below a certain value and highly conductive when said potential is at least equal to said certain value.

10. In a modulation indicator, the combination of a gaseous discharge device having an anode, a cathode and a grid, said device being adapted to change from a non-conductive condition to a conductive condition when the voltage on said grid is of a certain value, means to reduce modulated radio frequency oscillations to modulated unidirectional electromotive force and to supply said electromotive force to said grid, means normally so to energize said grid and anode that said device is in one of said conditions and changes to the other condition when the modulation of said unidirectional voltage varies beyond a predetermined value and whereby said device returns to its first condition when said percentage modulation changes in the opposite direction beyond said predetermined value, and means connected between said anode and cathode to indicate said change in condition.

ROBERT B. DOME.